United States Patent Office 2,958,545
Patented Nov. 1, 1960

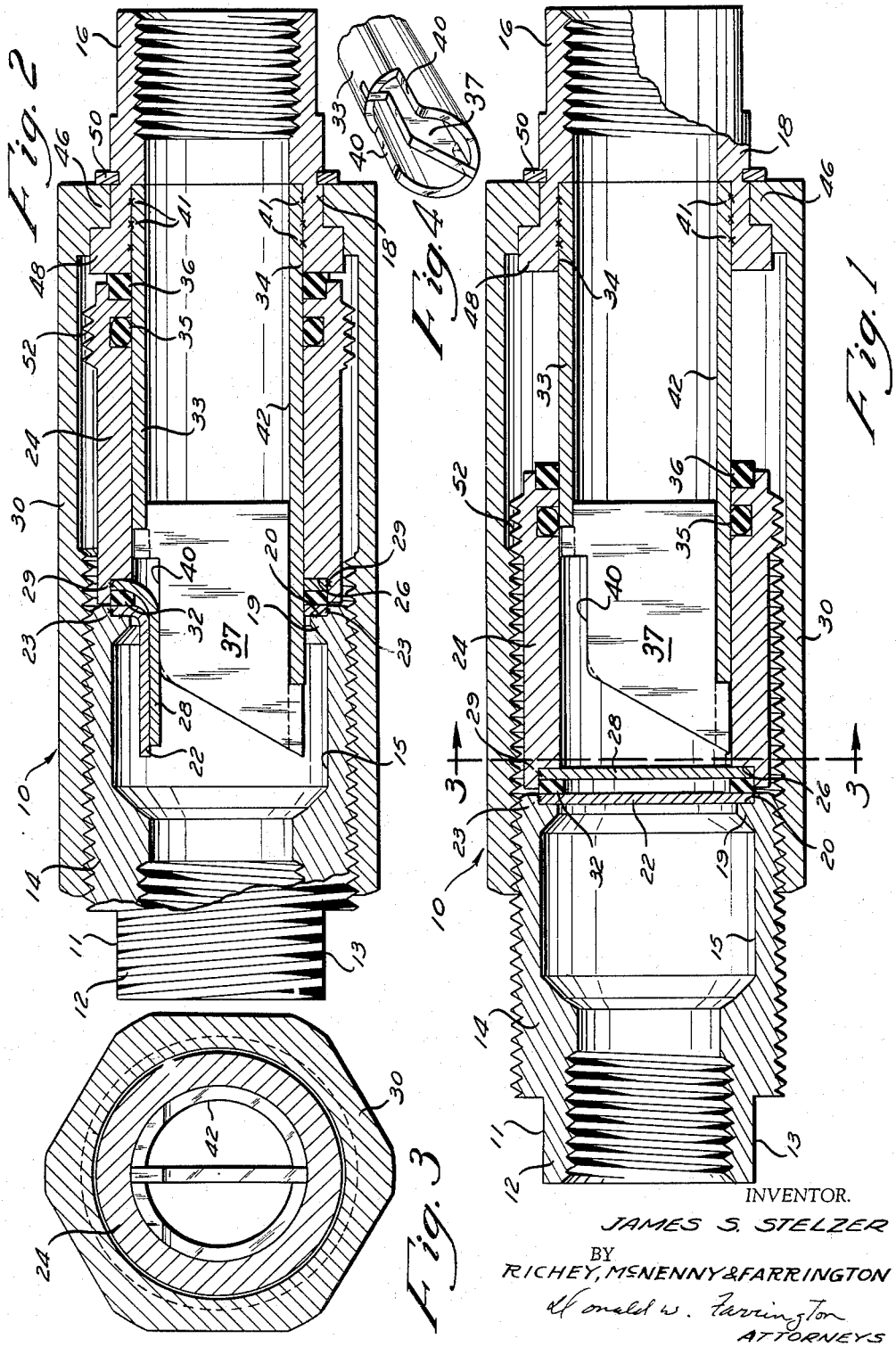

2,958,545

RUPTURABLE UNION DEVICE

James S. Stelzer, Fort Wayne, Ind., assignor to The Weatherhead Company, Cleveland, Ohio, a corporation of Ohio Filed Sept. 15, 1958, Ser. No. 760,984

6 Claims. (Cl. 285—3)

This invention relates to a tubular coupling apparatus and more particularly to a rupturable union device within the coupling for effecting communication between coupled members.

It is frequently desirable or even necessary to establish a fluid coupling between a pair of tubular members without allowing any leakage whatsoever of the fluid involved. Such a situation may arise by reason of certain possible safety hazards that may result from escape or leakage of material from the tube, by reason of the high cost of the fluid or for other reasons.

It is accordingly an object of this invention to facilitate fluid communication between a pair of tubular members for the transfer of fluid therebetween without the loss or escape of any of the fluid therein. By establishing fluid tight abutment between hermetically sealed ends of tube coupling members, each attached to and in communication with one of the tubes and thereafter rupturing the hermetic seal from entirely within the coupling, fluid communication between the tubes is established without loss or escape of fluid.

It is another object of this invention to facilitate and simplify the rupturing of a hermetic seal enclosed within a tube coupling to establish communication through such a ruptured seal. By the provision of an internal punch coupled to and movable with an exterior member movable relative to other parts of the coupling, access to the interior of the coupling is rendered unnecessary.

Other and further objects and advantages of this invention will become apparent from a perusal of the following detailed description thereof considered with the accompanying drawings in which:

Figure 1 is a cross-sectional, elevational view of the invention showing the arrangement of parts in one position prior to rupture of the hermetic seal thereof, Figure 2 is a cross-sectional, elevational view of the invention showing the arrangement of parts in another position subsequent to rupture of the hermetic seal thereof, Figure 3 is a cross-sectional end view of the invention taken along section 3—3 of Figure 1, and Figure 4 is a detailed view in perspective of the diaphragm rupturing punch.

Referring now to the drawings, 10 represents generally the coupling of this invention for establishing and maintaining communication between a pair of aligned components either or both of which may be a flexible tube, and one of which may be a fixed member. A first of such components may be sealingly threaded on an end 12 of a male body member 14 having opposed wrench flats 11 and 13 and a second of such members may be sealingly threaded on an end 16 of tubular punch holder 18. Male body member 14 is hollowed at 15 and provided with an inwardly directed annular ridge 19 and a recess 20 at its inner end for receiving a sealing diaphragm 22 preferably of light gauge copper and shown exaggerated in thickness in the drawings. Diaphragm 22 is brazed to body member 14 about its periphery as indicated at 23 to provide a hermetic seal for one end of the hollow of this member. In the normal original condition of the coupling, communication is established from one of the components to the point of the diaphragm 22.

A hollow, tubular cap member 24 is disposed in endwise alignment with body member 14 and is also provided with an annular recess 26 for receiving a sealing diaphragm 28 also made of light gauge copper and shown exaggerated in thickness in the drawings. Diaphragm 28 may be brazed in position as shown at 29 for effecting a tight hermetic seal at one end of the cap member.

For effecting a tight seal between body member 14 and cap member 24, and for restraining relative rotation between these members when the same are maintained in endwise proximity by a nut 30 threadedly engaging the exteriors of the body and cap members, an annular flexible gasket 32 made of rubber or other suitable plastic material is bonded in the recess 26 between outer adjacent portions of the diaphragms. The axial extent of the gasket exceeds the axial depth of its recess portion whereby portions of the gasket protrude axially from the cap member. Endwise pressure on gasket 32 effects a slight extrusion of the same against the surface of the body and cap members to effect a tight seal at the diaphragms in the event that any leakage at diaphragms 22 and 28 should occur after rupture thereof, as hereinbelow described, and further effects a tight frictional coupling between members 14 and 24 to prevent relative rotation therebetween under certain conditions.

A punch 33 is disposed in a counterbore 34 of punch holder 18. The punch slides in the cap member 24 and a pair of gasket seals 35 and 36 disposed in annular recesses of cap member 24 prevent leakage of fluid between the punch and the cap member. The inner end of punch 33 is slanted as shown and is provided with a similarly slanted knife member 37 welded or otherwise secured to punch 33. The knife 37 cooperates with the slant edges of the tube to cut the diaphragms 22 and 28. A segmental portion 40 of the punch is cut away from the upper inner end, as shown in the drawings, for a purpose to be made clear.

Fluid communication is established from the other component through a bore in punch holder 18 and a bore 42 in punch 33 to the diaphragm 28 and to maintain sealed engagement between the punch 33 and holder 18, these parts are brazed together along contacting surfaces as indicated at 41.

For facilitating longitudinal movement of punch 33 along coupling 10 to cause the punch 33 to rupture the diaphragms 22 and 28, interiorly threaded nut 30 is in threaded engagement with body member 14 and is coupled to punch 33 through an internal end flange 46 in abutment with an external shoulder of flange 48 at the end of punch holder 18. The flange 46 is maintained in abutment with flange 48 by a snap ring 50 disposed in an exterior, annular recess in punch holder 18. Accordingly, by a rotary motion manually applied to nut 30 in threaded engagement with body member 14, punch 33 is longitudinally translated along coupling 10 and in one inward direction of movement is effective to engage and successively sever the diaphragms 22 and 28 and bend the same upwardly and away as shown in Figure 2 of the drawing to a position wherein they do not obstruct the flow of fluid through the coupling and past the severed diaphragms. The cut-away segment 40 accommodates the bent diaphragms as shown. The relative movement between coupling parts is accommodated by the flexible tube coupled to either or both of the body member and cap member. It may be understood that the body member or the cap member may be attached to a fixed component as long as the other member is attached to a flexible tube or other member so as to accommodate the shortening of the coupling for the rupture of the diaphragms.

Initially, nut 30, punch holder 18, punch 33 and cap member 24 are arranged as a sub-assembly wherein the snap ring 50 maintains nut 30 and punch holder 18 together, punch 33 is brazed in the punch holder and a threaded portion 52 of cap member 24 engages nut 30 along an intermediate portion of the threads thereof to support the cap member and maintain the same in fixed position relative to the other parts. To assemble the coupling, nut 30 is threaded along cap member 24, sufficiently far that the cap member is within the nut enabling threading of the nut on the body member 14. As the nut advances along the body member, it reaches the point where gasket 32 engages diaphragm 22 to prevent relative rotation between body member 14 and cap member 24, and nut 30 continues to advance relative to these members to the position shown in Figure 1, wherein the punch 33 has advanced into the cap member and provides support for it. In this position, nut 30 has advanced beyond engagement with the threads 52 of cap member 24. In this position the nose of the punch is adjacent to the diaphragms and in readiness for rupturing the same.

To establish communication through the coupling 10, nut 30 is rotated further advancing nut 30 along body 14 and in the manner explained hereinabove the diaphragms 22 and 28 are successively ruptured and bent upwardly and away by the sharp nose end of the punch 33 as shown in Figure 2 of the drawings. In this position gasket 32 is tightly squeezed between the body and cap members to provide a tight seal at its location and gasket 36 is tightly squeezed between the other end of the cap member and the inner end of the punch holder to provide a tight seal at this point.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A rupturable union device comprising a body member in communication with a fluid carrying tube and having a diaphragm hermetically sealing the end thereof, a cap member in communication with another tube and having a diaphragm hermetically sealing the end thereof, said cap member being in endwise alignment with said body member and each having a thread longitudinally along an exterior portion thereof, a tubular punch movable along the interior of said cap member, a nut interiorly threaded to engage the threaded portion of said cap and body members and flange means coupling said nut to said punch whereby rotation of said nut is effective to move said punch longitudinally to rupture said diaphragms and establish communication between said tubes through the tubular punch.

2. A rupturable union device comprising a hollow body member having a diaphragm sealing one end thereof, a hollow cap member having a diaphragm sealing one end thereof, the sealed ends of said body member and cap member being in alignment, a flexible gasket compressed between said diaphragms, said body member and cap member being exteriorly threaded along portions thereof and a nut interiorly threaded for engagement with said body and cap members, a hollow punch slidable within said cap member and having a pointed nose adjacent to said diaphragms, said nut being coupled to said punch for unitary axial movement relative to said cap and body members whereby rotation of said nut is effective to advance the nose of said punch into said diaphragms to sever and rupture the same and establish communication between said body and cap members.

3. A rupturable union device in accordance with claim 2 wherein the nose of said punch is axially slotted to form a pair of pointed projections and a segmental portion of said punch is removed to accommodate said diaphragms after being severed by said punch.

4. A rupturable union device comprising a hollow body member having a sealing diaphragm closing one end, a cap member adjacent to said body member having a sealing diaphragm closing one end, a flexible gasket bonded to said cap member and the diaphragm thereof and being engageable with the diaphragm of said body member to effect a frictional coupling therebetween, an elongated nut movable relative to said member and a punch coupled to said nut for unitary axial movement and movable along the interior of said cap member, said punch having a sharp nose for puncturing said diaphragms in response to axial movement of said nut and punch.

5. A rupturable union device comprising a hollow body member having a sealing diaphragm closing one end, a cap member adjacent to said body member and having a sealing diaphragm closing one end adjacent to said body member, each of said body and cap members being threaded along external portions thereof and a nut internally threaded along said body and cap members, a flexible plastic gasket tightly secured to said cap member at the end thereof and being engageable with said body member to provide a tight rotary coupling therebetween in response to axial compression of said members, a punch coupled to said nut for unitary axial movement, said punch having a pointed nose for rupturing said diaphragms in response to axial movement of said nut and punch by rotation of said nut.

6. A rupturable union comprising a body member connected to a fluid carrying tube, a cap member connected to a second tube, said body and cap member being in alignment with each other axially and a diaphragm hermetically sealing each of said body and cap members, said body and cap members being exteriorly threaded, means including a tubular punch slidable within said cap, a tubular punch advancing sleeve interiorly threaded to engage the threads of said cap member, inter-engaging means on said punch and sleeve for moving said punch along the interior of said cap and body members relative to said diaphragms in response to rotation of said sleeve to establish fluid communication between said tubes through said tubular punch.

References Cited in the file of this patent

UNITED STATES PATENTS

| 1,121,847 | Kirkwood | Dec. 22, 1914 |
| 2,507,379 | Morrison | May 9, 1950 |
| 2,667,760 | Curtis | Feb. 2, 1954 |